H. KILLAM.
Securing Hubs to Axles.
No. 107,783.             Patented Sept. 27, 1870.
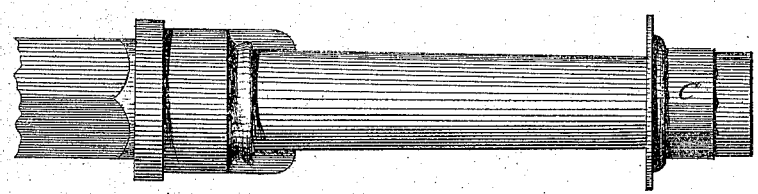
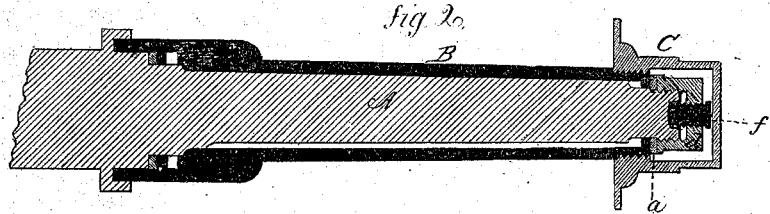
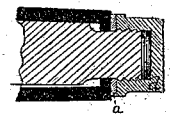

United States Patent Office.

HENRY KILLAM, OF NEW HAVEN, CONNECTICUT.

Letters Patent No. 107,783, dated September 27, 1870.

IMPROVEMENT IN CARRIAGE-AXLES.

The Schedule referred to in these Letters Patent and making part of the same.

*To all whom it may concern:*

Be it known that I, HENRY KILLAM, of New Haven, in the county of New Haven and State of Connecticut, have invented a new Improvement in Carriage-Axles; and I do hereby declare the following, when taken in connection with the accompanying drawing and the letters of reference marked thereon, to be a full, clear, and exact description of the same, and which said drawings constitute part of this specification, and represent in—

Figure 1, a side view, and in

Figure 2 a longitudinal section.

This invention relates to an improvement in that class of axles in which a nut on the end of the axle is turned on to compress a flexible washer against the end of the box.

In this construction, if the nut be turned up against the flexible washer, the turning of the wheel is liable to screw on the nut and set the wheel. To overcome this difficulty, a D-shaped collar has heretofore been introduced between the flexible washer and nut. The D-shape prevents the washer from turning; but, in this construction, a difficulty occurs, for if the nut, by accident, be turned a little too tight, the wheel is bound, and there is no means of governing the pressure.

To overcome these difficulties is the object of the present invention, which consists in the arrangement of a stop in the nut, so that, when turned up to a certain defined point, the bearing will come directly upon the end of the axle, thus dispensing with the D-shaped collar, as the nut cannot be screwed on beyond that certain point, but the point made adjustable to accommodate different thicknesses of washers.

A is the axle;

B, the box;

$a$, the flexible washer; and $d$ the nut.

Through the end of the nut I place a set-screw, $f$, with a finer thread than that of the nut and axle, and so as to bear against the end of the axle, or into a recess formed in the end of the axle, as seen in the drawing.

When the wheel is placed on the axle, and the flexible washer next the box, the nut $d$ is then screwed on until in the proper position for the free turning of the wheel, then the screw $f$ is turned down hard onto its seat in the end of the axle. This prevents the nut from turning with the wheel, and, at the same time, insures the resetting of the nut, after removal, to precisely the same position, and, by the screw, the position of the nut may be easily adjusted to different thicknesses of washers.

Instead of the screw, as shown in fig. 2, substantially the same result may be obtained by thin metal disks, placed within the nut, so as to fill the space between the head of the nut and the end of the axle, as seen in Figure 3, the number of disks being governed by the thickness of the washer. The thicker the washer, the greater the number of disks, it being only necessary that a firm bearing be made between the axle and nut, to govern the position of the washer.

In this class of axles it is common to cover the nut $d$ by a larger nut, C, turning onto the box.

I claim as my invention—

In combination with the axle A, box B, and flexible washer $a$, the nut $d$, when the said nut is constructed or provided with a device for adjusting or fixing its position on the axle, substantially in the manner herein set forth.

HENRY KILLAM.

Witnesses:
J. H. SHUMWAY,
A. J. TIBBITS.